US008320286B2

(12) United States Patent
Ptasinski

(10) Patent No.: US 8,320,286 B2
(45) Date of Patent: Nov. 27, 2012

(54) INFRASTRUCTURE OFFLOAD WAKE ON WIRELESS LAN (WOWL)

(75) Inventor: Henry Ptasinski, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 1101 days.

(21) Appl. No.: 12/042,928

(22) Filed: Mar. 5, 2008

(65) Prior Publication Data

US 2008/0219196 A1 Sep. 11, 2008

Related U.S. Application Data

(60) Provisional application No. 60/893,978, filed on Mar. 9, 2007.

(51) Int. Cl.
*G06F 17/00* (2006.01)
(52) U.S. Cl. ........................................................ 370/311
(58) Field of Classification Search .................... 370/311
See application file for complete search history.

(56) References Cited

U.S. PATENT DOCUMENTS

| 6,393,457 | B1 * | 5/2002 | Allison et al. ............... 709/201 |
| 2004/0213289 | A1 * | 10/2004 | Liu et al. ...................... 370/469 |
| 2005/0216776 | A1 * | 9/2005 | Watanabe ..................... 713/300 |
| 2007/0071018 | A1 * | 3/2007 | Laboy et al. ................. 370/401 |

* cited by examiner

*Primary Examiner* — Sulaiman Nooristany
(74) *Attorney, Agent, or Firm* — Garlick & Markison; William W. Kidd

(57) ABSTRACT

Aspects of an infrastructure offload wake on wireless LAN (WOWL) are described. An aspect of the system may include a networked device, or station, which may communicate one or more filters to an infrastructure networking device. The infrastructure networking device may utilize the filters to perform pattern matching operations on frames or packets received from the network for delivery to at least the station while the station is in an inactive, or low-power, state. When pattern matching operations performed at the infrastructure networking device indicate receipt of a frame or packet on behalf of the inactive station, which matches at least one of the filters, the infrastructure networking device may store an indication value. The indication value may denote receipt of at least one frame or packet that matched at least one of the filters, which were communicated to the infrastructure networking device by the station.

20 Claims, 11 Drawing Sheets

INFRASTRUCTURE OFFLOAD WAKE ON WIRELESS LAN (WOWL)

CROSS-REFERENCE TO RELATED APPLICATIONS/INCORPORATION BY REFERENCE

This application makes reference to, claims priority to, and claims the benefit of U.S. Provisional Application Ser. No. 60/893,978 filed on Mar. 9, 2007, which is hereby incorporated herein by reference in its entirety.

FIELD OF THE INVENTION

Certain embodiments of the invention relate to communication networks. More specifically, certain embodiments of the invention relate to a method and system for an infrastructure offload wake on wireless LAN (WOWL).

BACKGROUND OF THE INVENTION

Networked devices typically comprise at least two components: a network interface controller (NIC) and a central processing unit (CPU, or "host"). The networked device may be connected to other networked devices via a network, such as a local area network (LAN), a metropolitan area network (MAN), or wide area network (WAN) such as the Internet. Networks may utilize wired networking technologies and/or wireless networking technologies. IEEE 802 describes communication architectures, which enable networked devices to communicate via a LAN or MAN.

A given networked device may utilize procedures to reduce power consumption. When reducing power consumption the host may enter an inactive state while still enabling the networked device to be accessible to other networked devices on the network. In wired networks, a common method used by networked devices for reducing power consumption is known as "Wake on LAN" (WoL).

In WoL systems, the host may program the NIC to monitor traffic received from the network based on a filter or set of filters. The filter(s) may be utilized by the NIC to perform pattern matching operations on packets received from the network. The host may then enter a low power, or inactive, state. While the host is in the inactive state, the NIC may continuously monitor traffic received from the network. When the pattern matching operations indicate receipt of a packet that matches one of the filters, the NIC may send a wakeup signal to the host, causing the host to exit the inactive state and to subsequently enter an active state. The transition from inactive state to active state may correspond to increased power consumption at the networked device.

IEEE 802.11 describes a communication architecture, which may enable networked devices to communicate via wireless local area networks (WLANs). One of the building blocks for the WLAN is the basic service set (BSS). A BSS may comprise a plurality of networked devices, or stations (STA), which may communicate wirelessly via one or more RF channels within a coverage area. The span of a coverage area may be determined based on the distance over which a source STA may transmit data via an RF channel, which may be received by a destination STA.

An independent BSS (IBSS) refers to a BSS, which comprises a set of STAs, which may communicate with each other over within the coverage area for the BSS. In an IBSS each STA may engage in direct communication with any of the other STAs within the IBSS. An IBSS may be referred to as an ad hoc network.

An infrastructure BSS refers to a BSS, which is one of a plurality of BSSes, which are associated in a larger network referred to as an extended service set (ESS). The ESS is identified by a service set identifier (SSID). An infrastructure BSS may also be referred to as a BSS. Each of the BSSs within an ESS is identified by a BSS identifier (BSSID). Thus, STAs within a BSS generally determine their association within the BSS based on a BSSID and an SSID.

Communication between BSSs occurs via a distribution system (DS). The DS may utilize wired and/or wireless communication technologies. A BSS is able to establish communication to the DS via an access point (AP). The AP is a member of the BSS.

Each BSS comprises a plurality of STAs and an AP. The AP forms an association with each of the STAs within the BSS. The AP identifies each association by an association identifier (AID). The AP may provide communication services to STAs within a BSS based on the presence of an established association.

Within an infrastructure BSS, communication between STAs typically occurs via the AP. For example, when a STA_A within the BSS attempts to communicate with a STA_B within the BSS, the STA_A sends data to an AP_1, which subsequently sends the data to the STA_B. When the STA_A within BSS_1 attempts to communicate with a STA_X within a BSS_2, the STA_A sends data to the AP_1 within BSS_1. The AP_1 sends the data via the DS to an AP_2 within the BSS_2. The AP_2 sends the data to the STA_X within the BSS_2.

Within a BSS or IBSS, a STA may operate in two power management modes: an active mode (AM) and/or a power-save mode (PS). When the STA is operating in the AM, the STA may be fully powered (within the capabilities of the power supply, for example) and may transmit and/or receive data. When the STA is operating in the PS mode (or "sleeping"), the STA may enter a doze state during which it operates at lower power consumption (when compared to AM) and capabilities for receiving data may be disabled. In an IBSS, a STA communicates its current power management mode to each of the other STAs within the IBSS. In a BSS, a STA communicates its current power management mode to the AP.

When a STA within a BSS is operating in an AM, the AP may send data to the STA. When the STA is operating in PS mode, the AP may store, or buffer, data, which is to be sent to the STA. At determined time intervals, the AP transmits beacon frames to the STAs within the BSS. STAs, which are operating in PS mode, may depart from the doze state during these time intervals to receive the beacon frames. The beacon frames may comprise a traffic indication map (TIM) information element. The TIM element comprises data, which indicates whether the AP is currently buffering data for one or more STAs within the BSS. Beacon frames may comprise a delivery TIM (DTIM) element. In the TIM element, a DTIM count enables the determination of whether the beacon frame contains a TIM or DTIM. When DTIM count equals 0, the TIM element is a DTIM element. In addition to the buffered unicast indication, a DTIM element comprises data which also allows the STAs to determine whether the AP is currently buffering data to be broadcast or multicast to a plurality of STAs within the BSS. The TIM (DTIM) element comprises a plurality of indication values, which are located based on an AID. For example, a STA may determine whether the AP is currently buffering unicast data by indexing the TIM data based on the AID assigned to the STA for its association with the AP. Additionally, a STA may determine whether the AP is currently buffering broadcast and multicast data by indexing the DTIM data based on the AID designated for the buffered broadcast and multicast traffic indication for the BSS.

When a STA determines that broadcast and multicast data is being buffered at the AP, the STA may leave the doze state to receive the buffered data. When a STA determines that unicast data is buffered at the AP, the STA may enter AM or poll the AP to receive the buffered data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

An infrastructure offload wake on wireless LAN (WOWL) method and system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
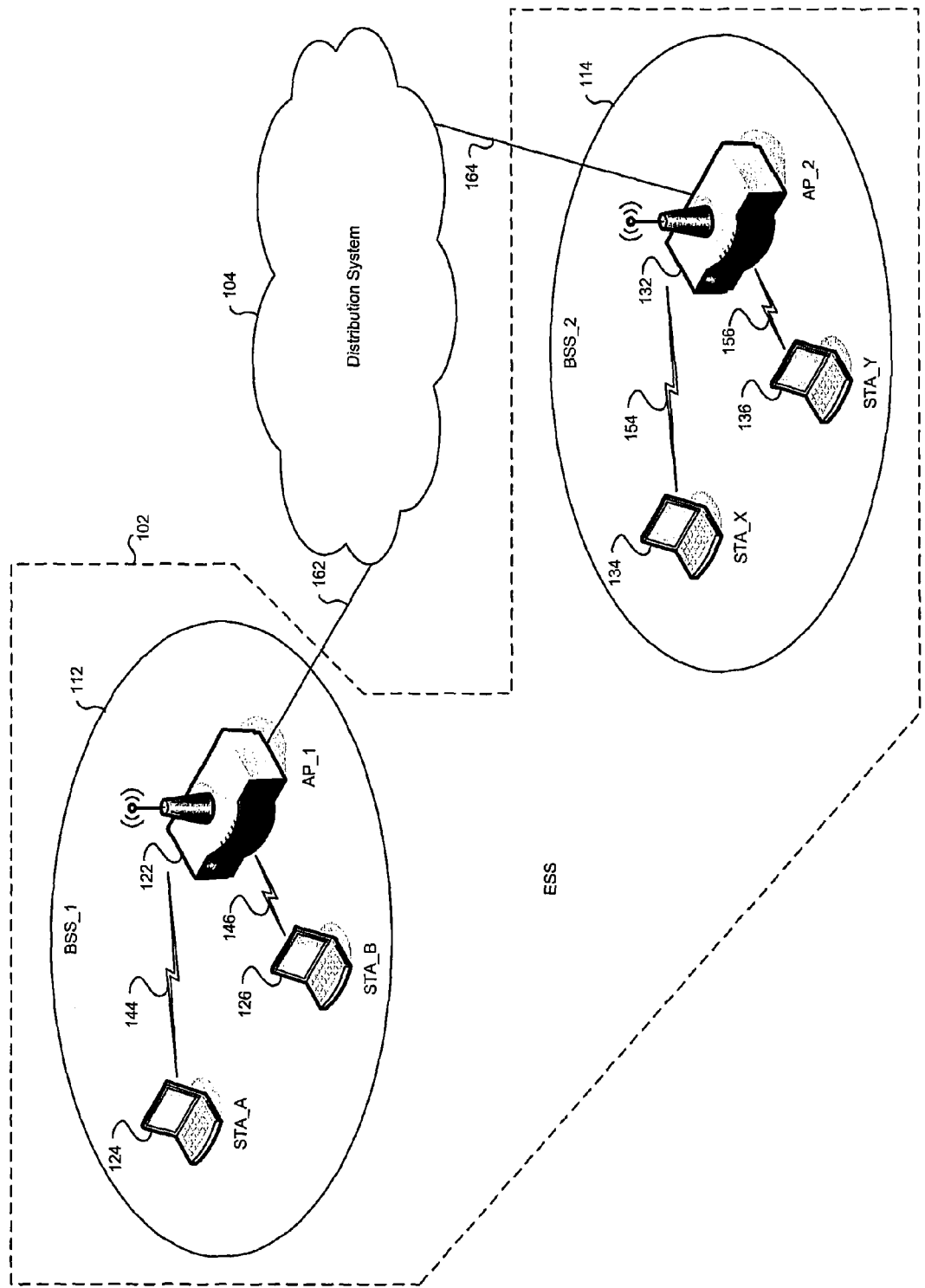
FIG. 1 is a block diagram of an exemplary system for wireless data communication, which may be utilized in connection with an embodiment of the invention.

Certain embodiments of the invention may be found in an infrastructure offload wake on wireless LAN (WOWL). Various embodiments of the invention may comprise a method and system in which a networked device, or station, may communicate one or more filters to an infrastructure networking device. The infrastructure networking device may utilize the filters to perform pattern matching operations on packets received from the network for delivery to at least the station while the station is in an inactive, or low-power, state. When pattern matching operations performed at the infrastructure networking device indicate receipt of a packet on behalf of the inactive station, which matches at least one of the filters, the infrastructure networking device may store an indication value. The indication value may denote receipt of at least one packet that matched at least one of the filters, which were communicated to the infrastructure networking device by the station.

In various embodiments of the invention, one or more indication values may be utilized by an infrastructure networking device to indicate pattern matches based on the filter(s). For example, a distinct indication value among a plurality of indication values may indicate a pattern match based on a distinct filter among a plurality of filters. Similarly, a distinct indication value among a plurality of indication values may indicate a pattern match based on any of a selected group of filters among a plurality of filters.

In one aspect of the invention, the infrastructure networking device may send current values for the one or more indication values to the station. In various embodiments of the invention, this may be referred to as passive WOWL. In another aspect of the invention, the station may send a message, such as a poll request for example, to the infrastructure networking device to request that the infrastructure networking device send current values for the one or more indication values to the station in response to, for example, the poll request. In various embodiments of the invention, this may be referred to as an active WOWL. In another aspect of the invention, the infrastructure networking device may send current values for the one or more indication values to the station; the station may respond by sending, for example, sending a poll request to the infrastructure networking device; and the infrastructure networking device may response to the poll request by sending, to the station, additional information associated with the previously sent one or more indication values. In various embodiments of the invention, this may be referred to as a hybrid WOWL.

Various embodiments of the invention may be practiced when the infrastructure networking device and the station communicate via wireless networking technologies, such as WLANs. Various embodiments of the invention may be practiced when the infrastructure networking device and the station communicate via wired networking technologies, such as wired LANs. Various embodiments of the invention may be practiced when the infrastructure networking device and the station communicate via any combination of wired networking technologies and/or wireless networking technologies. In general, an infrastructure networking device may refer to a device, which enables networked devices to communicate via a network. An AP is an exemplary infrastructure networking device, which may be utilized to enable networked devices (for example, STAs) to communicate via a WLAN. An Ethernet switching device is an exemplary infrastructure. networking device, which may be utilized to enable networked devices to communicate via a LAN.

FIG. 1 is a block diagram of an exemplary system for wireless data communication, which may be utilized in connection with an embodiment of the invention. FIG. 1 shows an exemplary WLAN. Referring to FIG. 1, there is shown an ESS 102 and a distribution system (DS) 104. The ESS 102 comprises a BSS_1 112 and a BSS_2 114. The BSS_1 112 comprises an AP_1 122, a WLAN station STA_A 124 and a STA_B 126. The BSS_2 114 comprises an AP_2 132, a STA_X 134 and a STA_Y 136. Each STA 124, 126, 134 and 136 may comprise a NIC and a host.

The ESS 102 may be identified by an SSID=$SSID_0$, for example. The BSS_1 112 may be identified by a BSSID=$BSSID_1$, for example. The BSS_2 114 may be identified by a BSSID=$BSSID_2$, for example. The association between the STA_A 124 and the AP_1 122 may be identified by an AID=1, for example. The association between the STA_B 126 and the AP_1 122 may be identified by an AID=2, for example. The association between the STA_X 134 and the AP_2 132 may be identified by an AID=1, for example. The association between the STA_Y 136 and the AP_2 132 may be identified by an AID=2, for example.

The DS 104 may provide an infrastructure, which may be utilized to enable any of the STAs within the BSS_1 112 to communicate with any of the STAs within BSS_2 114, or vice versa. The DS 104 may utilize wireless communication (for example, via one or more RF channels), wired communication (for example, via copper or optical fiber cabling) or a combination thereof.

Within the BSS_1 112, the AP_1 122 may communicate with the STA_A 124 via one or more RF channels 144. The AP_1 122 may communicate with the STA_B 126 via one or more RF channels 146. The STA_A 124 may communicate with the STA_B 126 by sending a frame to the AP_1 122. Upon receipt of the frame, the AP_1 122 may determine that the destination for the frame is the STA_B 126. The AP_1 122 may then send the frame to the STA_B 126. Within the BSS_2 114, the AP_2 132 may communicate with the STA_X 134 via one or more RF channels 154. The AP_2 132 may communicate with the STA_Y 136 via one or more RF channels 156. The STA_X 134 and STA_Y 136 may communicate in a manner, which may be substantially similar to that described for the STA_A 124 and the STA_B 126.

Once the AP_1 122 has established associations with the STA_A 124 and the STA_B 126, the AP_1 122 may communicate reachability information to the AP_2 132 via the DS 104. The reachability information may enable the AP_2 132 to determine a route by which frames may be delivered to the STA_A 124 and/or the STA_B 126. For example, if the STA_X 134 sends a frame to the AP_2 132 for which the destination address identifies the STA_A 124, the AP_2 132 may send the frame to the AP_1 122 via the DS 104. The interface 164 over which the AP_2 132 sends the frame to the DS 104 may utilize a wired interface (such as copper or optical fiber cabling) and/or wireless interface (such as one or more RF channels). Similarly, the interface 162 over which the AP_1 122 receives the frame from the DS 104 may utilize a wired interface and/or wireless interface.

When a STA is operating in a power-save (PS) mode, the STA may send a frame to the AP, which informs the AP that the STA is entering a PS mode. When the STA enters the PS mode, the NIC and the host contained within the STA may enter a low-power operating state. Consequently, the AP_1 122 has knowledge about the power management mode of the STA_A 124 and the STA_B 126.

In various embodiments of the invention, a STA, which may be entering the PS mode may communicate one or more filter descriptors, or filters, to the AP. The filter descriptors may describe the characteristics of filters, which are to be utilized by the AP when receiving frames on behalf of the STA. An exemplary filter characteristic may comprise a filtering pattern, such as a bit pattern, which may be utilized by the AP to locate a matching bit pattern in a received frame. The AP may then utilize the filters to perform pattern matching operation on received frames. In an exemplary embodiment of the invention, the AP may detect a match between a received frame and a given filter when a bit pattern contained within a selected field within the received frame (where the selected field may be determined based on the filter descriptor) matches a pattern defined in the filter descriptor.

In an exemplary embodiment of the invention, the STA may generate a MAC service data unit (MSDU), which comprises a set of $n_f$ fragments. Each of the $n_f$ MSDU fragments may correspond to a distinct one of a set of $n_f$ filter descriptors (where $n_f \geq 1$). The STA may transmit a set of $n_f$ frames to the AP, wherein each frame comprises a distinct one of the generated plurality of $n_f$ MSDU fragments. In other exemplary embodiments of the invention, the STA may transmit a plurality of filter descriptors within each frame.

When the AP_1 122 receives a frame from, for example, the DS 104 or an associated STA, for example STA_B 126, and determines that the destination for the frame is the STA_A 124, the AP_1 122 may send the frame to the STA_A 124 via one or more RF channels 144 in instances when the STA_A 124 is determined by the AP_1 122 to be currently operating in an active mode (AM). In instances when the AP_1 122 identifies that the STA_A 124 is in operating a power-save (PS) mode, the AP_1 122 may determine whether one or more filters have been received from the STA_A 124. In instances when the AP_1 122 has received or more filters from the STA_A 124, the AP_1 122 may perform pattern matching operations on the received frames, which are destined for the STA_A 124. In instances when a match is detected, the AP_1 122 may store an indication value, M[k, AID]=1, where k is an index for an indication value, which may be associated with one or more filters and the AID value, AID=1, identifies the STA_A 124 from which the AP_1 122 received the filter descriptor(s). For each indication value, the AP_1 122 may also buffer the received frame(s) and/or descriptive data, or metadata, associated with the received frame in a buffer, $EF_{buf}[k,AID]$, in instances when a pattern match with the corresponding filter descriptor(s) occurs. When the received frame(s) is addressed to a multicast group address or broadcast address, the buffered frame may be converted to a unicast frame, which comprises a destination address that identifies the STA_A 124.

In various embodiments of the invention a STA may communicate to an AP a maximum number of indication values, $k_{max}$, which are to be associated with the $n_f$ filter descriptors, where $1 \leq k_{max} \leq n_f$. The STA may also communicate a correspondence relationship between each indication value and one or more filter descriptors. In an exemplary embodiment of the invention in which $k_{max}=1$, the single indication value M[1,AID]=1 may indicate that the AP detected a match between at least one received frame and at least one filter descriptor. In an exemplary embodiment of the invention in which $k_{max}=n_f$, an indication value M[k,AID]=1 may indicate that the AP detected a match between at least one received frame and the $k^{th}$ filter descriptor. In an exemplary embodiment of the invention in which $1<k_{max}<n_f$, an indication value M[k,AID]=1 may indicate that the AP detected a match between at least one received frame and a specified one or more among the set of $n_f$ filter descriptors.

In an exemplary embodiment of the invention, the number of indication values associated with a STA may be equal to the number of filter descriptors communicated by the STA to the AP ($k_{max}=n_f$). In instances when a frame is received at an AP on behalf of a STA, identified by the AID value, and a match is not detected based on the $k^{th}$ filter descriptor received from that STA, the AP may maintain the current value for the indication value M[k,AID]. In an exemplary embodiment of the invention, the initialized value for each indication value is M[k,AID]=0 for each filter descriptor received from the STA identified by the AID value. When the current value for a given indication value is M[k,AID]=0, the AP may maintain the value M[k,AID]=0 in instances when a frame is received at the AP on behalf of the STA, identified by the AID value, and a match is not detected based on the $k^{th}$ filter descriptor received from that STA. When the current value for a given indication value is M[k,AID]=1, the AP may maintain the value M[k,AID]=1 in instances when a frame is received at the AP on behalf of the STA, identified by the AID value, and a match is not detected based on the $k^{th}$ filter descriptor received from that STA.

Various embodiments of the invention may utilize a passive WOWL method. In an exemplary embodiment of the invention, at determined time intervals, the AP_1 122 may broadcast beacon frames to the STA_A 124 and the STA_B 126. When the STA_A 124 is in PS mode, the NIC within the STA_A 124 may leave the doze state to enable reception of the transmitted beacon frames. The received beacon frames may comprise a TIM information element. The TIM information element may comprise one or more M[k,AID] values each of which may provide an indication that the AP_1 122 has received at least one frame on behalf of a STA, identified by the AID value, which matched a filter, identified by the index k. The STA_A 124 may determine, based on a value M[k,AID=1]=1 that the AP_1 122 has received at least one frame destined for the STA_A 124, which matched the $k^{th}$ filter descriptor that was communicated to the AP_1 122. The STA_A 124 may determine, based on a value M[k,AID=1]=0 that the AP_1 122 has not received a frame destined for the STA_A 124, which matched the $k^{th}$ filter descriptor that was communicated to the AP_1 122. In an exemplary embodiment of the invention, the indication values may be contained within a PS_Match field within the TIM element. A given indication value M[k,AID] may be located within the PS_Match field based on the association identifier value, AID, and the filter index value k. The AID value may be determined based on the association between the AP, which transmitted the beacon frames, and the STA, which received the beacon frames.

When the STA_A 124 receives at least one indication value M[k,AID=1]=1, the STA_A 124 NIC may send a signal, for example a host wakeup signal, to the STA_A 124 host. The STA_A 124 host may exit the low-power operating state in response to the received host wakeup signal and may return to an active operating state. The STA_A 124 host may process the one or more M[k,AID=1] values and, in response, cause the STA_A 124 to send a frame to the AP_1 122, which informs AP_1 122 that the STA_A 124 has entered an AM operating state.

Various embodiments of the invention may utilize an active WOWL method. In an exemplary embodiment of the invention, at determined time intervals, the STA_A 124 NIC may send a poll request message, which is addressed to the AP_1 122. Upon receipt of the poll request message from the STA_A 124, the AP_1 122 may transmit one or more frames to STA_A 124. The transmitted frames may comprise a TIM information element. The TIM information element may comprise one or more M[k,AID=1] values each of which may provide an indication that the AP_1 122 has received at least one frame on behalf of the STA_A 124, which matched the $k^{th}$ filter received by the AP_1 122 from the STA_A 124.

The STA_A 124 may determine, based on a value M[k,AID=1]=1 that the AP_1 122 has received at least one frame destined for the STA_A 124, which matched the $k^{th}$ filter descriptor that was communicated to the AP_1 122. The STA_A 124 may determine, based on a value M[k,AID=1]=0 that the AP_1 122 has not received a frame destined for the STA_A 124, which matched the $k^{th}$ filter descriptor that was communicated to the AP_1 122.

When the STA_A 124 receives at least one indication value M[k,AID=1]=1, the STA_A 124 NIC may process the one or more M[k,AID=1] values and, in response, the STA_A 124 NIC may send a message, for example, a host wakeup signal to the STA_A 124 host. In response, the STA_A 124 host may cause the STA_A 124 NIC to send a frame to the AP_1 122, which informs the AP_1 122 that the STA_A 124 has entered an AM operating state. When the STA_A 124 does not receive at least one indication value M[k,AID=1]=1, the STA_A 124 NIC may process the one or more M[k,AID=1] values and, in response, cause the STA_A124 NIC and the STA_A 124 host to remain in a low-power operating state.

Various embodiments of the invention may utilize a hybrid WOWL method. An exemplary embodiment of the invention may comprise a broadcast phase and a poll response phase. In the broadcast phase, at determined time intervals, the AP_1 122 may broadcast beacon frames to the STA_A 124 and the STA_B 126. When the STA_A 124 is in PS mode, the NIC within the STA_A 124 may leave the doze state to enable reception of the transmitted beacon frames. The received beacon frames may comprise a TIM information element. The TIM information element may comprise one or more M[k,AID] values each of which may provide an indication that the AP_1 122 has received at least one frame on behalf of a STA, identified by the AID value, which matched a filter, identified by the index k. The STA_A 124 may determine, based on a value M[k,AID=1]=1 that the AP_1 122 has received at least one frame destined for the STA_A 124, which matched the $k^{th}$ filter descriptor that was communicated to the AP_1 122. The STA_A 124 may determine, based on a value M[k,AID=1]=0 that the AP_1 122 has not received a frame destined for the STA_A 124, which matched the $k^{th}$ filter descriptor that was communicated to the AP_1 122. In an exemplary embodiment of the invention, the indication values may be contained within a PS_Match field within the TIM element. A given indication value M[k,AID] may be located within the PS_Match field based on the association identifier value, AID, and the filter index value k. The AID value may be determined based on the association between the AP, which transmitted the beacon frames, and the STA, which received the beacon frames.

When STA_A 124 receives at least one indication value M[k,AID=1]=1, the STA_A 124 NIC may cause the STA_A 124 to send at least one frame to the AP_1 122. At least one of the frames transmitted by the STA_A 124 may comprise a poll request message. Upon receipt of the poll request message from the STA_A 124, the AP_1 122 may transmit one or more frames to the STA_A 124. The transmitted frames may comprise a buffered data $EF_{buf}[k,AID]$. The buffered data may comprise stored frames, which were received by AP_1 122 on behalf of the STA_A 124, which matched the $k^{th}$ filter descriptor received by the AP_1 122 from the STA_A 124. The buffered data may comprise metadata associated with frames that matched the $k^{th}$ filter, for example, the buffered data may comprise frame type information for each received frame that matched the $k^{th}$ filter.

Upon receipt of the buffered data and/or metadata from the AP_1 122, the STA_A 124 NIC may send a message, for example a host wakeup signal, to the STA_A 124 host. The STA_A 124 host may exit the low-power operating state in response to the received host wakeup signal and may return to an active operating state. The STA_A 124 host may cause the STA_A 124 NIC to send an indication to the AP_1 122, which informs the AP_1 122 that the STA_A 124 has entered an AM operating state.

In an exemplary embodiment of the invention, the AP may generate a MAC service data unit (MSDU), which comprises a plurality of k fragments. Each of the k MSDU fragments may correspond to a distinct one of the $EF_{buf}[k,AID]$ buffered data items. The AP_1 122 may transmit a plurality of k frames, wherein each frame comprises a distinct one of the generated plurality of k MSDU fragments. In other exemplary embodiments of the invention an AP may transmit a plurality of $EF_{buf}[k,AID]$ buffered data items within each frame.

When the STA_A 124 receives the buffered data $EF_{buf}[k,AID]$, the STA_A 124 NIC may process the buffered data $EF_{buf}[k,AID]$. The STA_A 124 NIC processing may be performed in instances where the filters previously sent from the STA_A 124 to the AP_1 122 correspond to a subset of the indication values received from the AP_1 122. The STA_A 124 NIC processing may be performed in instances where one or more of the filter descriptors utilized at the AP_1 122 differ from one or more filter descriptors, which were previously sent by the STA_A 124 to the AP_1 122. In response to processing of the buffered data, the STA_A 124 NIC may send a host wakeup signal to the STA_A 124 host. The STA_A 124 host may perform additional processing on the buffered data. The STA_A 124 may send a frame to the AP_1 122, which informs the AP_1 122 that the STA_A 124 has entered an AM operating state.

Alternatively, the STA_A 124 NIC may process the buffered data $EF_{buf}[k,AID]$ and determine that the STA_A 124 is to remain in a low-power operating state. The STA_A 124 host and the STA_A 124 NIC may remain in the low-power operating state after the STA_A 124 NIC has processed the buffered data, $EF_{buf}[k,AID]$.

Indication values $M[k,AID]$ and buffered data $EF_{buf}[k,AID]$ may be communicated within the same frame and/or information element. For example, an AP may transmit a beacon frame, which comprises indication values $M[k,AID]$ and buffered data buffered data $EF_{buf}[k,AID]$.

In various embodiments of the invention $M[k,AID]$ values may be sent utilizing a DTIM information element, however, various embodiments of the invention are not limited to the communication of indication values within TIM and/or DTIM information elements. Various embodiments of the invention may not be limited to infrastructure BSSes but may also be practiced in IBSSes.

Figure 2:
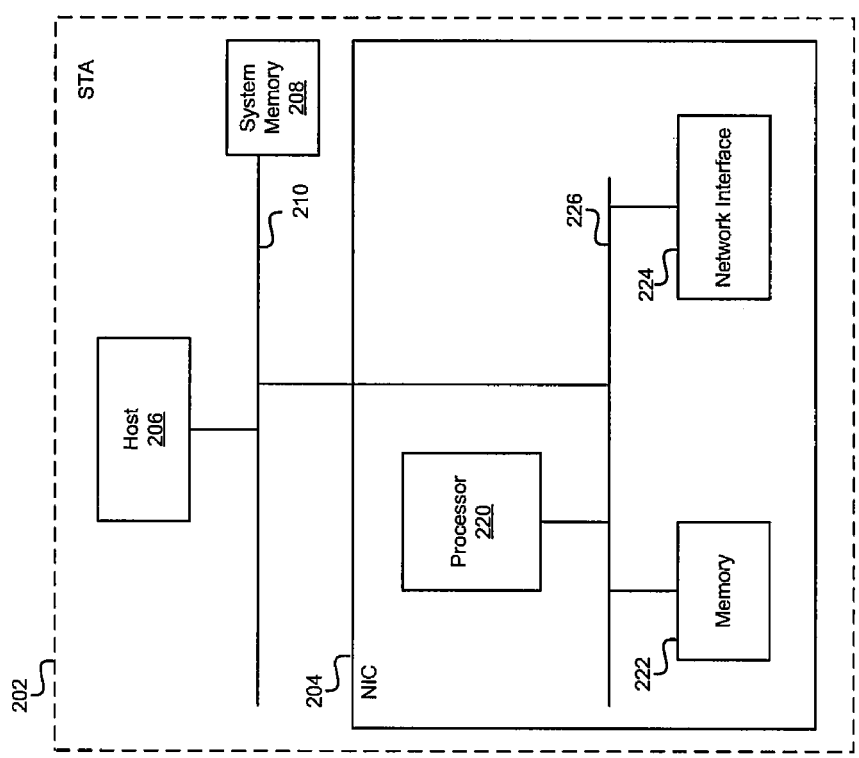
FIG. 2 is a block diagram of an exemplary networked device, which may be utilized in connection with an embodiment of the invention.

FIG. 2 is a block diagram of an exemplary networked device, which may be utilized in connection with an embodiment of the invention. Referring to FIG. 2, there is shown a STA 202. The STA 202 is an exemplary networked device, which may represent illustrative NIC and host capabilities for STA_A 124, STA_B 126, STA_X 134, STA_Y 136, AP_1 122 and/or AP_2 132 (see FIG. 1). The STA 202 may comprise a network interface controller (NIC) 204, a host 206, a system memory 208, and a system bus 210. The NIC 204 may comprise a processor 220, a memory 222, a network interface 224, and a local bus 226.

The host 206 may comprise suitable logic, circuitry, and/or code that may enable processing of received indication values $M[k,AID]$ and/or buffered data $EF_{buf}[k,AID]$. The host 206 may receive host wakeup signals and/or generate NIC wakeup signals. The host 206 may enable the generation of poll status messages and/or processing of frames received by the STA 202. The host 206 may enable the generation of one or more filter descriptors. The host 206 may be coupled to the system bus 210.

The system memory 208 may comprise suitable logic, circuitry, and/or code that may be utilized to store, or write, and/or retrieve, or read, information, data, and/or code. The system memory 208 may be utilized to store one or more filter descriptors, received indication values $M[k,AID]$ and/or buffered data $EF_{buf}[k,AID]$. The system memory 208 may utilize one or more memory technologies such as random access memory (RAM), and/or nonvolatile memory, for example electrically erasable programmable read only memory (EEPROM). The system memory 208 may be coupled to the system bus 210.

The NIC 204 may comprise suitable circuitry, logic and/or code that may enable the STA 202 to transmit and/or receive frames via a WLAN and/or LAN, for example, an Ethernet network. The NIC 204 may receive NIC wakeup signals and/or generate host wakeup signals. The NIC 204 may enable the generation and/or transmission of poll status messages and/or reception of frames, such as beacon frames, via a WLAN or LAN, and/or the processing of received frames. The NIC 204 may be coupled to the system bus 210. The 204 may be coupled to a WLAN and/or LAN network by physical medium, such as cabling, and/or via one or more RF channels.

The processor 220 may comprise suitable logic, circuitry, and/or code that may enable the NIC 204 to wakeup at specified times to receive beacon frames, for example. The processor 220 may enable the NIC 204 to generate, process, transmit and/or receive frames. The processor 220 may enable the NIC 204 to process received NIC wakeup signals and/or generate host wakeup signals. The processor 220 may enable the NIC 220 to transmit filter descriptors. The processor 220 may be coupled to the local bus 226. The local bus 226 may be coupled to the system bus 210.

The memory 222 may comprise suitable logic, circuitry, and/or code that may be utilized to store, or write, and/or retrieve, or read, information, data, and/or executable code. The memory 222 may enable the NIC 204 to store one or more filter descriptors. The memory 222 may utilize one or more memory technologies such as random access memory (RAM), and/or nonvolatile memory, for example electrically erasable programmable read only memory (EEPROM). The memory 222 may be coupled to the local bus 226.

The network interface 224 may receive signals, which enable the transmission and/or reception of frames via a LAN or WLAN. The network interface 224 may generate RF signals for transmission of frames via a WLAN and/or generate electrical and/or optical signals for transmission of frames via a LAN. The network interface 224 may detect RF signals for reception of frames via a WLAN and/or detect electrical and/or optical signals for reception of frames via a LAN. The network interface 224 may be coupled to the local bus 226.

Figure 3:
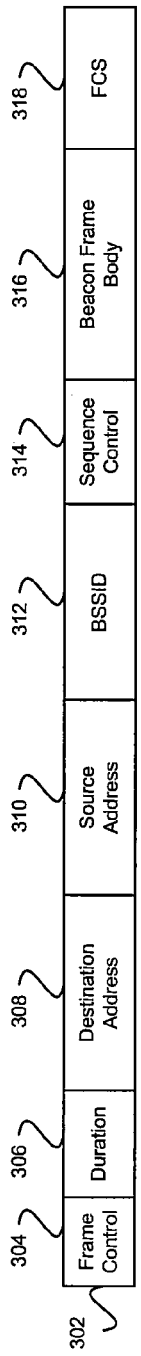
FIG. 3A is a block diagram for an exemplary beacon frame format in accordance with an embodiment of the invention.
FIG. 3B is a block diagram for an exemplary beacon frame body format in accordance with an embodiment of the invention.
FIG. 3C is a block diagram for an exemplary traffic indication map information element in accordance with an embodiment of the invention.
FIG. 3D is a block diagram for an exemplary filter match indication field in accordance with an embodiment of the invention.
Figure 3:
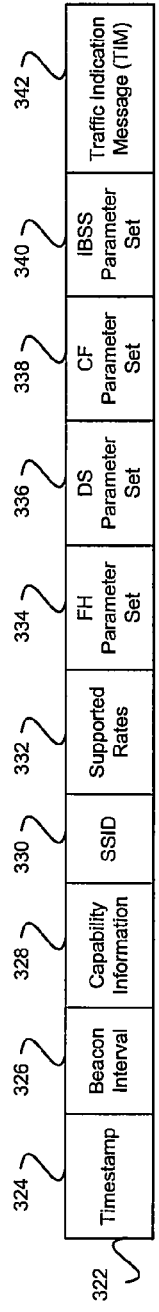
Figure 3:
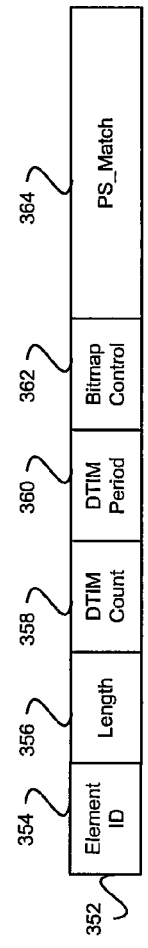
Figure 3:
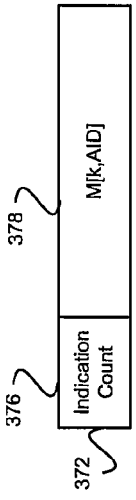

FIG. 3A is a block diagram for an exemplary beacon frame format in accordance with an embodiment of the invention.

With reference to FIG. 3A there is shown a beacon frame format 302. The beacon frame 302 may comprise a frame control field 304, a duration field 306, a destination address field 308, a source address field 310, a BSSID field 312, a sequence control field 314, a beacon frame body 316, and a frame check sequence (FCS) 318.

The frame control field 304 may comprise information that identifies the frame 302 as being a beacon frame. The duration field 306 may comprise a value, which is computed based on the data rate at which the beacon frame 302 may be transmitted. The destination address field 308 may identify one or more STAs, which are intended to receive the beacon frame 302. The source address field 310 may identify the AP, which transmitted the beacon frame 302. The BSSID field 312 may contain the BSSID value of a BSS to which the beacon frame is being communicated. The sequence control field 314 may be utilized to indicate whether the current frame 302 is being transmitted within an MSDU fragment. The beacon frame body 316 may comprise information that may be specific to a beacon frame. In various embodiments of the invention, the beacon frame body 316 comprises a TIM information element, which in turn comprises a PS_Match field. The FCS field 318 may be utilized to detect and/or correct bit errors in a beacon frame 302 received at a STA.

FIG. 3B is a block diagram for an exemplary beacon frame body format in accordance with an embodiment of the invention. With reference to FIG. 3B, there is shown a beacon frame body format 322. The beacon frame body format 322 may comprise a timestamp field 324, a beacon interval field 326, a capability information field 328, an SSID field 330, a supported rates field 332, a frequency hopping (FH) parameter set field 334, a direct sequence (DS) spread spectrum parameter set field 336, a contention free (CF) parameter set field 338, an independent BSS (IBSS) parameter set field 340 and a traffic indication map (TIM) field 342.

The timestamp field 324 may indicate a time instant at which the beacon frame was transmitted. The timestamp value inserted into the timestamp field 324 may be determined based on a timing source utilized by the AP, which is transmitting the beacon frame. The beacon interval field 326 may indicate the amount of time that may transpire between beacon frame transmissions. The capability information field 328 may be used to communicate capabilities available at the AP, which is transmitting the beacon frame. The SSID field 330 may comprise the SSID value that identifies the corresponding ESS to which the BSS (identified by the BSSID field 312) belongs. The supported rates field 332 may indicate data rates that may be supported by the AP, which may be transmitting the beacon frame.

The FH parameter set field 334 may comprise information, which enables STAs receiving the beacon frame to utilize frequency hopping when communicating with the AP that is transmitting the beacon frame. The DS parameter set field 336 may comprise information, which enables RF channel assignment to the STAs when communicating with the AP. The CF parameter set field 338 may comprise information, which enables the AP that is transmitting the beacon frame to perform contention free polling of STAs, which are associated with the AP. The IBSS parameter set 340 may comprise information, which may be utilized by a STA within an IBSS. The TIM information element 342 comprises information, which may enable an AP to communicate indication values M[k,AID] to one or more STAs within the BSS.

FIG. 3C is a block diagram for an exemplary traffic indication map information element in accordance with an embodiment of the invention. With reference to FIG. 3C, there is shown a traffic indication map (TIM) information element (IE) 352. The TIM IE 352 may comprise an element identifier (ID) field 354, a length field 356, a DTIM count field 358, a DTIM period 360, a bitmap control field 362 and a PS_Match field 364. The element ID field 354 may identify the TIM IE.

The length field 356 may specify the total length (as measured in octets, for example) of the DTIM count 358, DTIM period 360, bitmap control 362 and PS_Match field 364. The DTIM count field 358 may indicate how many more beacon frames may be transmitted (including the current beacon frame) before a beacon frame is transmitted that comprises a DTIM. For example, a DTIM count value of 0, within the DTIM count field 358, may indicate that the current beacon frame comprises a DTIM. The DTIM period field 360 may indicate the interval between transmissions of beacon frames comprising a DTIM. For example, a value of 1 in the DTIM period field 360 may indicate that each transmitted beacon frame comprises a DTIM. The PS_Match field 364 may comprise one or more indication values M[k,AID]. Each of the indication values may be determined based on filter descriptors received by an AP from a STA.

FIG. 3D is a block diagram for an exemplary filter match indication field in accordance with an embodiment of the invention. The filter match indication field shown in FIG. 3D is an exemplary field, which corresponds to the PS_Match field 364 (FIG. 3C). Referring to FIG. 3D, there is shown an exemplary PS_Match field 372. The PS_Match field 372 may comprise a indication count field 376 and indication value, M[k,AID], field 378.

The indication count field 376 may identify the number of indication value(s), $k_{max}(AID)$, which are associated with each STA (as identified by an AID value) within a BSS. In an exemplary embodiment of the invention, the number of $k_{max}(AID)$ values within the indication count field 376 may correspond to the number of STAs, $n_{AID}$, which are associated with the AP within the BSS. The M[k,AID] field 378 may comprise $n_{AID}$ sets of $k_{max}(AID)$ indication values, wherein each set of indication values is associated with a distinct STA within the BSS.

Figure 4:
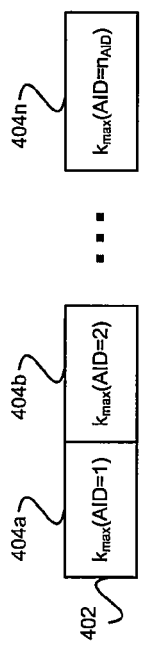
FIG. 4A is a block diagram for an exemplary indication count field in accordance with an embodiment of the invention.
FIG. 4B is a block diagram for an exemplary filter match indication field in accordance with an embodiment of the invention.
Figure 4:

FIG. 4A is a block diagram for an exemplary indication count field in accordance with an embodiment of the invention. The exemplary indication count field shown in FIG. 4A presents illustrative detail of the indication count field 376 (FIG. 3D). Referring to FIG. 4A, there is shown an indication count field 402. The indication count field 402 may comprise a plurality of indication count values including an indication count value for a STA identified by the value AID=1, $k_{max}(AID=1)$ 404a, an indication count value for a STA identified by the value AID=2, $k_{max}(AID=2)$ 404b and an indication count value for a STA identified by the value AID=$n_{AID}$, $k_{max}(AID=n_{AID})$ 404n. Each indication count value 404a, 404b, . . . , and 404n may indicate the number of indication values associated with STAs identified by AID=1, AID=2, . . . , and AID=$n_{AID}$, respectively.

FIG. 4B is a block diagram for an exemplary filter match indication field in accordance with an embodiment of the invention. The exemplary filter match indication field shown in FIG. 4B presents illustrative detail of the M[k,AID] field 378 (FIG. 3D). Referring to FIG. 4B, there is shown an M[k,AID] field 412. The M[k,AID] field 412 may comprise a plurality indication value sets 412a, 412b, . . . , and 412n, wherein each set comprises a plurality of $k_{max}(AID)$ bits.

The indication value set M[1 . . . $k_{max}(AID=1),AID=1]$ 412a comprises a plurality of $k_{max}(AID=1)$ bits, wherein each bit comprises an indication value, which corresponds to at least one filter descriptor associated with the STA identified by the value AID=1. The indication value set M[1 . . . $k_{max}$ (AID=2),AID=2] 412b comprises a plurality of $k_{max}$(AID=2) bits, wherein each bit comprises an indication value, which corresponds to at least one filter descriptor associated with the STA identified by the value AID=2. The indication value set M[1 ... $k_{max}$(AID=$n_{AID}$),AID=$n_{AID}$] 412n comprises a plurality of $k_{max}$(AID=$n_{AID}$) bits, wherein each bit comprises an indication value, which corresponds to at least one filter descriptor associated with the STA identified by the value AID=$n_{AID}$.

Figure 5:
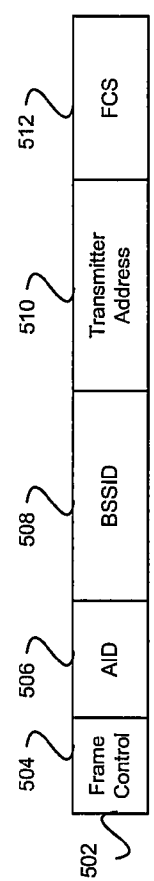
FIG. 5 is a block diagram for an exemplary poll status frame format in accordance with an embodiment of the invention.

FIG. 5 is a block diagram for an exemplary poll status frame format in accordance with an embodiment of the invention. With reference to FIG. 5 there is shown a poll status frame format 502. The poll status frame 502 may comprise a frame control field 504, an AID field 506, a BSSID field 508, a transmitter address field 510 and a frame check sequence (FCS) 512.

The frame control field 504 may comprise information that identifies the frame 502 as being a poll status frame, which is utilized to prompt the receiving AP to communicate one or more indication values and/or buffered data items to the STA. The AID field 506 may comprise an AID value, which identifies the STA, which transmitted the poll status frame. The BSSID field 508 may contain the BSSID value of a BSS to which the transmitting STA is a member. The BSSID field 508 may also represent a destination address for the AP to which the STA is associated. The transmitter address field 510 may comprise the address for the STA, which transmitted the poll status frame. The FCS field 512 may be utilized to detect and/or correct bit errors in a poll status frame 502 received at an AP.

In an exemplary embodiment of the invention, which utilizes an active WOWL, a STA may transmit a poll status frame 502 to an AP. In response, the AP may transmit one or more indication values associated with the STA. In an exemplary embodiment of the invention, which utilizes a hybrid WOWL, a STA may transmit a poll status frame 502 to an AP in response to receipt of a beacon frame. The AP may respond to the poll status frame 502 by transmitting buffered data items to the STA.

In an exemplary embodiment of the invention, a STA may generate one or more filter descriptors that are communicated to an AP. The STA may utilize a single indication value to indicate whether the AP has received one or more frame on behalf of the STA in which a match was detected between the received frame(s) and at least one of the filters as shown in the following exemplary flow chart diagrams.

Figure 6:
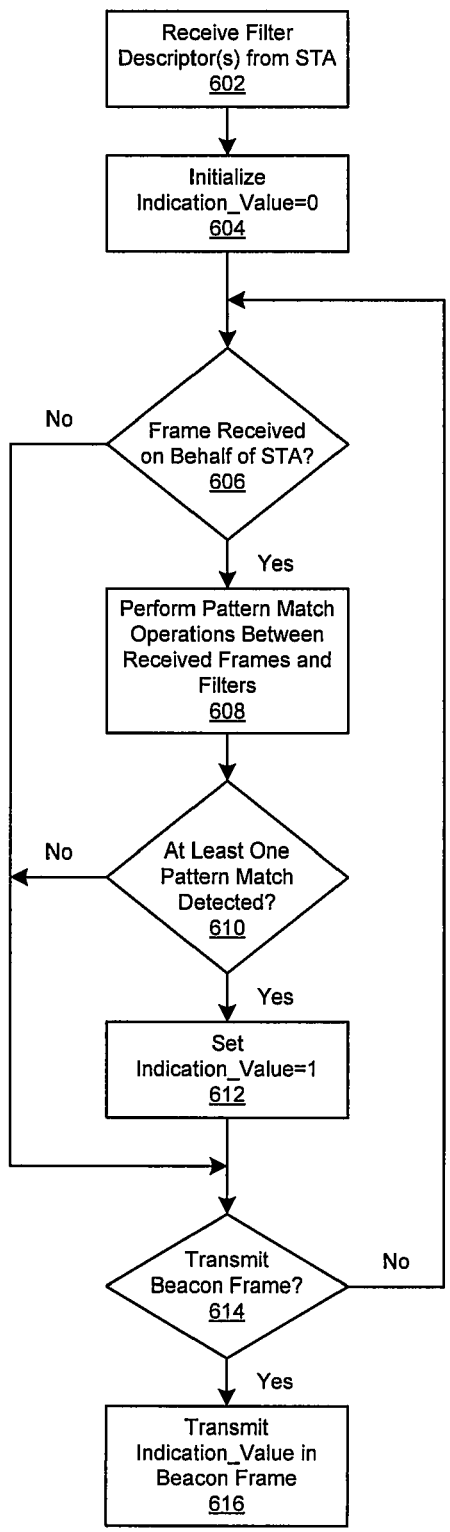
FIG. 6 is a flow chart, which illustrates exemplary steps for infrastructure networking device operation in a passive WOWL system, in accordance with an embodiment of the invention.

FIG. 6 is a flow chart, which illustrates exemplary steps for infrastructure networking device operation in a passive WOWL system, in accordance with an embodiment of the invention. Referring to FIG. 6, in step 602, an AP may receive one or more filter descriptors from a STA. The filter descriptors may be utilized in connection with pattern matching operations performed by the AP on frames received on behalf of the STA. The AP may utilize an indication value, Indication_Value, to indicate whether a pattern match has occurred. In step 604, the AP may perform initialization of the indication value by setting Indication_Value=0. In step 606, the AP may determine whether a frame has been received on behalf of the STA. In instances when a frame is received at the AP on behalf of the STA, in step 608, the AP may perform pattern matching operations between the received frame(s) and each of the filters.

In step 610, the AP may determine whether a pattern match has occurred between the received frame(s) and at least one of the filters. In instances when at least one pattern match is detected, in step 612, the AP may indicate the detected pattern match by setting Indication_Value=1. In step 614, the AP may determine whether to transmit a beacon frame at the present time instant. In instances when the AP transmits a beacon frame at the present time instant, in step 616, the transmitted beacon frame may comprise the current value for Indication_Value.

In instances when a frame has not been received at the AP on behalf of the STA in step 606, step 614 may follow. In instances when at least one pattern match has not been detected in step 610, the current value Indication_Value is maintained and step 614 may follow. In instances when a beacon frame is not transmitted by the AP at the present time instant in step 614, step 606 may follow.

Figure 7:
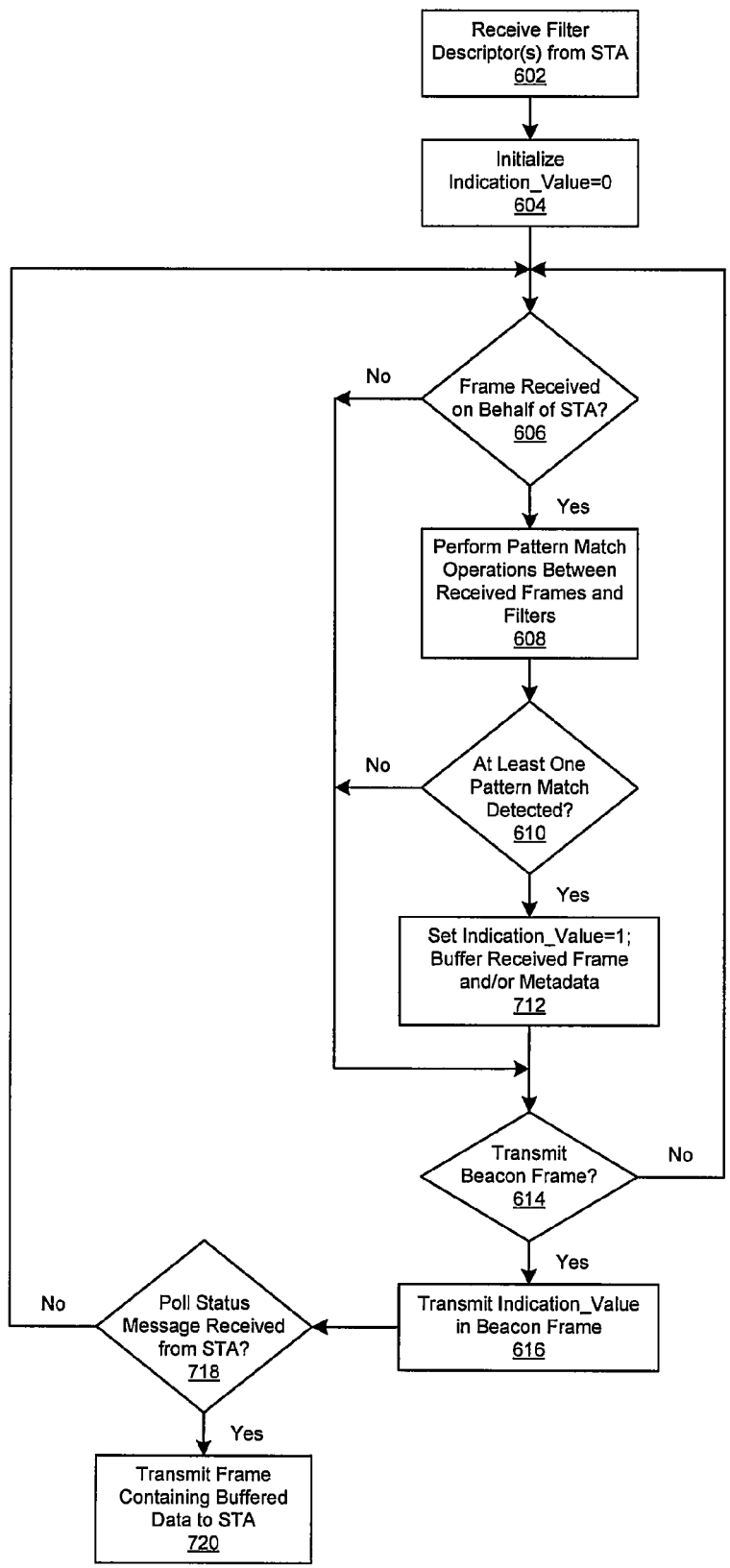
FIG. 7 is a flow chart, which illustrates exemplary steps for infrastructure networking device operation in a hybrid WOWL system, in accordance with an embodiment of the invention.

FIG. 7 is a flow chart, which illustrates exemplary steps for infrastructure networking device operation in a hybrid WOWL system, in accordance with an embodiment of the invention. The flow chart presented in FIG. 7 is substantially similar to the flow chart presented in FIG. 6 with the additions and modifications as set forth in the following paragraphs.

In instances when at least one pattern match is detected in step 610, in step 712, the AP may indicate the detected pattern match by setting Indication_Value=1. The AP may buffer the received frame(s) and/or metadata associated with the received frame(s). Step 614 follows step 712.

After transmitting the beacon frame in step 616, in step 718, the AP may determine whether a poll status message has been received from the STA. In instances when a poll status frame has been received from the STA, in step 720, the AP may transmit one or more frames, which comprise data buffered in step 712. In instances when a poll status frame has not been received from the STA, step 606 may follow.

Figure 8:
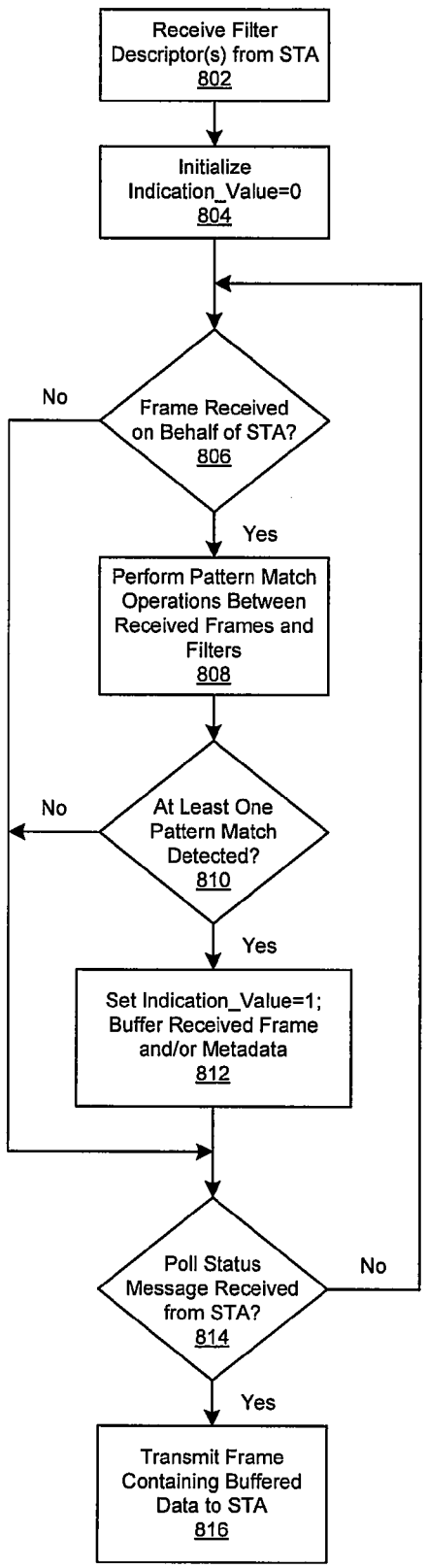
FIG. 8 is a flow chart, which illustrates exemplary steps for infrastructure networking device operation in an active WOWL system, in accordance with an embodiment of the invention.

FIG. 8 is a flow chart, which illustrates exemplary steps for infrastructure networking device operation in an active WOWL system, in accordance with an embodiment of the invention. Referring to FIG. 8, in step 802, an AP may receive one or more filter descriptors from a STA. In step 804, the AP may perform initialization of the indication value by setting Indication_Value=0. In step 806, the AP may determine whether a frame has been received on behalf of the STA. In instances when a frame is received at the AP on behalf of the STA, in step 808, the AP may perform pattern matching operations between the received frame(s) and each of the filters.

In step 810, the AP may determine whether a pattern match has occurred between the received frame(s) and at least one of the filters. In instances when at least one pattern match is detected, in step 812, the AP may indicate the detected pattern match by setting Indication_Value=1. The AP may buffer the received frame(s) and/or metadata associated with the received frame(s). In step 814, the AP may determine whether a poll status message has been received from the STA. In instances when the AP has received a poll status frame, in step 816, the AP may transmit one or more frames, which comprise data buffered in step 812.

In instances when a frame has not been received at the AP on behalf of the STA in step 806, step 814 may follow. In instances when at least one pattern match has not been detected in step 810, the current value Indication_Value is maintained and step 814 may follow. In instances when a poll status message has not been received in step 814, step 806 may follow.

Figure 9:
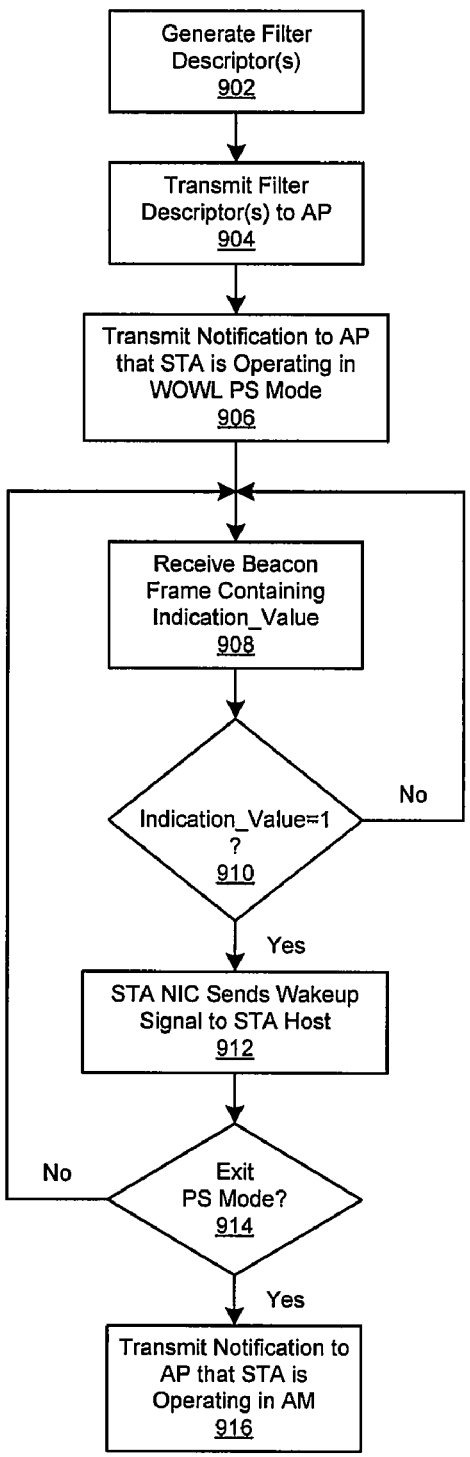
FIG. 9 is a flow chart, which illustrates exemplary steps for networked device operation in a passive WOWL system, in accordance with an embodiment of the invention.

FIG. 9 is a flow chart, which illustrates exemplary steps for networked device operation in a passive WOWL system, in accordance with an embodiment of the invention. Referring to FIG. 9, in step 902, a STA may generate one or more filter descriptors. In step 904, the STA may transmit the filter descriptors to an infrastructure networking device, such as an AP. In step 906, the STA may transmit a notification to the AP that the STA is operating in a WOWL power-save (PS) mode. The WOWL PS mode notification may enable the AP to determine that the filter descriptors received from the STA are to be utilized when receiving frames on behalf of the STA while the STA is operating in the WOWL PS mode.

In step 908, the STA may receive a beacon frame containing an Indication_Value associated with the STA. In step 910, the STA may determine whether the Indication_Value indicates that the AP has received at least one frame, which matched at least one of the filters transmitted to the AP in step 904. In an exemplary embodiment of the invention, a pattern match may be indicated when Indication_Value=1. In instances when the Indication_Value indicates that a pattern match has occurred, in step 912, the STA NIC may send a wakeup signal to the STA host. In step 914, the STA host may determine whether to exit PS mode based on the Indication_Value received in step 908. In instances when the STA host determined to exit PS mode, in step 916, the STA may transmit a notification to the AP that the STA is operating in active mode (AM).

In instances when the Indication_Value indicates that a pattern match has not occurred in step 910, step 908 may follow. In instances when the STA host determines to not exit PS mode in step 914, step 908 may follow.

Figure 10:
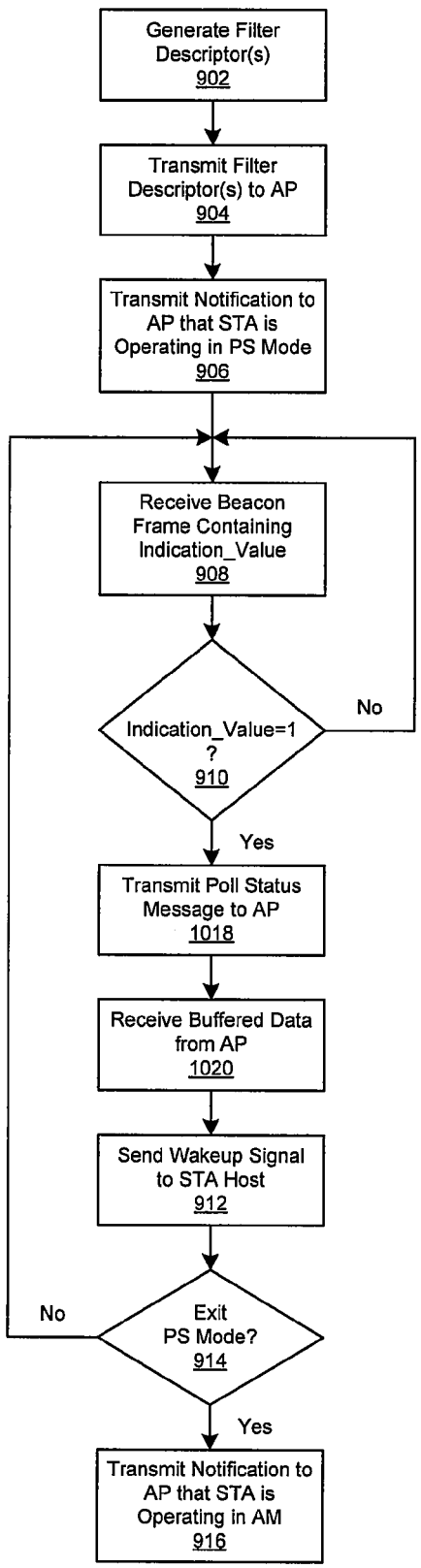
FIG. 10 is a flow chart, which illustrates exemplary steps for networked device operation in a hybrid WOWL system, in accordance with an embodiment of the invention.

FIG. 10 is a flow chart, which illustrates exemplary steps for networked device operation in a hybrid WOWL system, in accordance with an embodiment of the invention. The flow chart presented in FIG. 10 is substantially similar to the flow chart presented in FIG. 11 with the additions and modifications as set forth in the following paragraphs.

In instances when the Indication_Value indicates that a pattern match has occurred at step 910, in step 1018, the STA may transmit a poll status message to the AP. In step 1020, the STA may receive buffered data from the AP. The STA NIC may perform filtering and/or processing on the received buffered data. Step 912 may follow step 1020.

Figure 11:
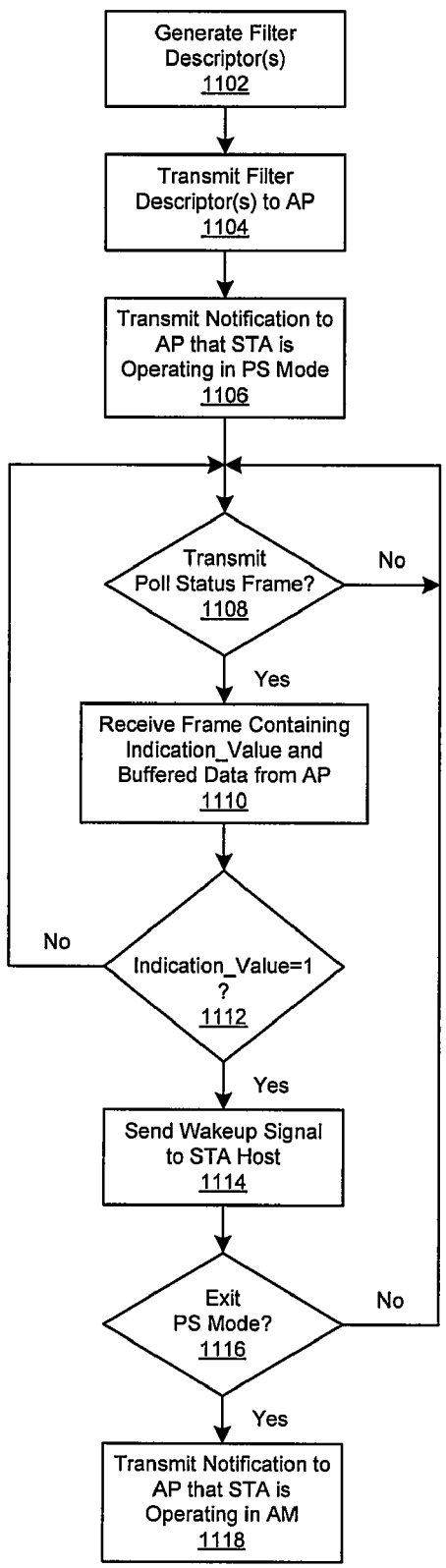
FIG. 11 is a flow chart, which illustrates exemplary steps for networked device operation in an active WOWL system, in accordance with an embodiment of the invention.

FIG. 11 is a flow chart, which illustrates exemplary steps for networked device operation in an active WOWL system, in accordance with an embodiment of the invention. Referring to FIG. 11, in step 1102, a STA may generate one or more filter descriptors. In step 1104, the STA may transmit the filter descriptors to an AP. In step 1106, the STA may transmit a notification to the AP that the STA is operating in a PS mode.

In step 1108 the STA may determine whether to transmit a poll status frame to the AP at the present time instant. The STA may remain at step 1108 until a poll status frame is transmitted. In instances when the STA does transmit a poll status frame to the AP, in step 1110, the STA may receive a frame, which comprises an Indication_Value. The received frame may also comprise buffered data, which is associated with the Indication_Value.

In step 1112, the STA may determine whether the Indication_Value indicates that the AP has received at least one frame, which matched at least one of the filters transmitted to the AP in step 1104. Additional filtering and/or processing of received frames may also be performed on the received frames. In instances when the Indication_Value indicates that a pattern match has occurred, in step 1114, the STA NIC may send a wakeup signal to the STA host. In step 1116, the STA host may determine whether to exit PS mode based on the Indication_Value and/or buffered data received in step 1110. In instances when the STA host determined to exit PS mode, in step 1118, the STA may transmit a notification to the AP that the STA is operating in AM.

In instances when the Indication_Value indicates that a pattern match has not occurred in step 1112, step 1108 may follow. In instances when the STA host determines to not exit PS mode in step 1116, step 1108 may follow.

In various embodiments of the invention, the filters may be utilized to implement a variety of functions. In an exemplary embodiment of the invention, the filters may enable pattern matches when a received frame comprises a specific network address or a specific set of network addresses. In an exemplary embodiment of the invention, the filters may enable pattern matches when a received frame comprises a specific port identifier, such as may enable determination of the whether the frame comprises data generated by a world wide web (WWW) related application, or an electronic mail (email) related application, or by a file transfer protocol (FTP) application, for example. In an exemplary embodiment of the invention, the filters may enable pattern matches when a received frame comprises a specific process identifier or set of process identifiers, such as may enable determination of whether the frame comprises data generated by a specific application instance (for example, a specific instance of a database application, which is executing on a remote STA as distinguished from other instances of the database application that may be executing on the same remote STA).

In various embodiments of the invention, the STA may communicate filters and/or information associated with the filters, which enables the AP to determine time instances when the AP may be allowed to communicate indications value(s) to the STA. The filters and/or associated information may enable the AP to perform authentication operations on received frames, such as verification of authentication keys, passwords, passphrases and/or authentication certificates.

In various embodiments of the invention, the STA 122 may communicate filters and/or information associated with the filters, which enables the AP 124 to determine a pattern match based on a sequence of received frames. For example, the AP 124 may utilize a first pattern in a pattern sequence for pattern matching operations. When a pattern match is detected, the AP 124 may infer that the received frame is the first frame in a multi-frame sequence. The AP 124 may then utilize a second pattern in the pattern sequence for pattern matching operations on the next frame received on behalf of the STA 122. If a pattern match is not detected for the second received frame, or for any subsequent received frame, the AP 124 may determine that a pattern match has not been detected between the pattern sequence and the sequence of received frames. In an exemplary embodiment of the invention, the pattern matching against received multi-frame sequences may enable the AP 124 to monitor the connection state for communications between the STA 122, on which behalf the AP 124 is filtering the frames, and the remote STA 122, which may be the source of the received frames.

Various embodiments of the invention may be practiced in instances when traffic comprises any of a variety of protocol data units (PDUs). Exemplary PDUs may comprise, but are not limited to, frames, packets or other entities, which are utilized to enable the communication of data via a network.

Another embodiment of the invention may provide a machine and/or computer readable medium, having stored thereon, a computer program having at least one code section executable by a machine and/or computer, thereby causing the machine and/or computer to perform the steps as described herein for infrastructure offload wake on a wireless LAN.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An apparatus to operate as an access point for a network comprising:
    one or more circuits operable to receive data from a first device for wireless transfer to a second device, in which the second device has a power-save mode to conserve power;
    the one or more circuits to compare a bit pattern of the data to one or more filtering patterns associated with the second device and to generate one or more values based on matching the data to the one or more filtering patterns, in which the one or more values to correspond to which of the one or more filtering patterns resulted in a match and in which the one or more values is set to an initial value prior to the comparison of the bit pattern to the one or more filtering patterns;
    wherein a bit value is changed from the initial value to indicate matching of the data to respective one or more filtering patterns; and
    the one or more circuits operable to wirelessly communicate the one or more values to the second device to wake the second device from the power-save mode based on comparison of the data to the one or more filtering patterns.

2. The apparatus of claim 1, wherein the one or more filtering patterns is determined based on one or more filtering descriptors received from the second device.

3. The apparatus of claim 1, wherein the one or more filtering patterns is determined based on one or more filtering descriptors received from the second device when the second device enters into the power-save mode.

4. The apparatus of claim 1, wherein the one or more circuits is integrated into an access point for a network.

5. The apparatus of claim 1, wherein the one or more circuits to provide wireless connections to both the first device and the second device.

6. The apparatus of claim 1, wherein when the one or more circuits to wirelessly communicate the one or more values to the second device, the one or more values are to be communicated in a beacon frame.

7. The apparatus of claim 1, wherein when the one or more circuits to generate one or more values based on matching the data to the one or more filtering patterns, the one or more circuits to buffer the data for subsequent transmission to the second device.

8. An apparatus to operate as an access point for a network comprising:
    a network interface operable to receive data from a source device for wireless transfer to a station device that operates within the network, in which the station device has a power-save mode to conserve power;
    a processor coupled to the network interface to compare a bit pattern of the data to one or more filtering patterns associated with the station device and to generate one or more values based on matching the data to the one or more filtering patterns, in which the one or more values to correspond to which of the one or more filtering patterns resulted in a match and in which the one or more values is set to an initial value prior to the comparison of the bit pattern to the one or more filtering patterns;
    wherein a bit value is changed from the initial value to indicate matching of the data to respective one or more filtering patterns; and
    the processor and the network interface operable to wirelessly communicate the one or more values to the station device to wake the station device from the power-save mode based on comparison of the data to the one or more filtering patterns.

9. The apparatus of claim 8, wherein the one or more filtering patterns is determined based on one or more filtering descriptors received from the station device.

10. The apparatus of claim 8, wherein the one or more filtering patterns is determined based on one or more filtering descriptors received from the station device when the station device enters into the power-save mode.

11. The apparatus of claim 8, further including a storage component coupled to the processor to store the filtering patterns.

12. The apparatus of claim 8, wherein the network interface includes circuitry to provide wireless connections to both the first device and the second device.

13. The apparatus of claim 8, wherein when the processor and the network interface to wirelessly communicate the one or more values to the station device, the one or more values are to be communicated in a beacon frame.

14. The apparatus of claim 8, wherein when the processor to generate one or more values based on matching the data to the one or more filtering patterns, a memory coupled to the processor to buffer the data for subsequent transmission to the station device.

15. A method comprising:
    receiving data at an infrastructure networking device from a source device, in which the data is destined for a destination station that communicates wirelessly with the infrastructure networking device and in which the destination station has a power- save mode to conserve power;
    comparing a bit pattern of the data to one or more filtering patterns associated with the destination station at the infrastructure networking device;
    generating one or more values based on matching the data to the one or more filtering patterns at the infrastructure networking device, in which the one or more values correspond to which of the one or more filtering patterns resulted in a match and in which the one or more values is set to an initial value prior to the comparison of the bit pattern to the one or more filtering patterns;

wherein when comparing the data, a bit value is changed from the initial value to indicate matching of the data to respective one or more filtering patterns; and communicating the one or more values wirelessly to the destination station to wake the destination station from the power-save mode based on comparison of the data to the one or more filtering patterns.

16. The method of claim 15, further including receiving one or more filtering descriptors from the destination station at the infrastructure networking device to determine the one or more filtering patterns.

17. The method of claim 15, further including receiving one or more filtering descriptors from the destination station at the infrastructure networking device, when the destination station enters into the power-save mode, to determine the one or more filtering patterns.

18. The method of claim 15, wherein when receiving data at the infrastructure networking device from the source device, the data is received wirelessly from the source device.

19. The method of claim 15, wherein when communicating the one or more values wirelessly to the destination station, the one or more values are communicated in a beacon frame.

20. The method of claim 15, wherein when generating one or more values based on matching the data to the one or more filtering patterns, the infrastructure networking device buffers the data for subsequent transmission to the destination station.

* * * * *